(12) United States Patent
Xu et al.

(10) Patent No.: US 11,204,230 B2
(45) Date of Patent: Dec. 21, 2021

(54) ADJUSTABLE VEHICLE WHEEL BRAKE SPACE INSPECTION TOOL

(71) Applicant: CITIC DICASTAL CO., LTD, Hebei (CN)

(72) Inventors: Zuo Xu, Hebei (CN); Bowen Xue, Hebei (CN); Ning Yu, Hebei (CN); Yachun Wan, Hebei (CN); Jiandong Guo, Hebei (CN)

(73) Assignee: CITIC DICASTAL CO., LTD., Hebei (CN)

( * ) Notice: Subject to any disclaimer, the term of this patent is extended or adjusted under 35 U.S.C. 154(b) by 223 days.

(21) Appl. No.: 16/564,700

(22) Filed: Sep. 9, 2019

(65) Prior Publication Data

US 2020/0191544 A1 Jun. 18, 2020

(30) Foreign Application Priority Data

Dec. 18, 2018 (CN) .......................... 201811546855.9

(51) Int. Cl.
*G01B 5/14* (2006.01)
*B60T 17/22* (2006.01)
(52) U.S. Cl.
CPC .............. *G01B 5/14* (2013.01); *B60T 17/221* (2013.01)
(58) Field of Classification Search
CPC ............ G01B 5/14; G01B 3/22; B60T 17/221
USPC .......................................... 33/609, 784, 832
See application file for complete search history.

(56) References Cited

U.S. PATENT DOCUMENTS

| 4,279,214 | A | * | 7/1981 | Thorn | F16D 66/02 |
| | | | | | 116/208 |
| 5,339,069 | A | * | 8/1994 | Penner | B60T 17/22 |
| | | | | | 116/208 |
| 5,358,076 | A | * | 10/1994 | Lucas | F16D 66/02 |
| | | | | | 116/208 |
| 5,848,672 | A | * | 12/1998 | Brearley | F16D 65/183 |
| | | | | | 188/1.11 L |
| 10,823,544 | B2 | * | 11/2020 | Xue | G01B 5/061 |
| 2008/0158353 | A1 | * | 7/2008 | McKinley | B60T 17/221 |
| | | | | | 348/128 |
| 2009/0084638 | A1 | * | 4/2009 | Masterson | F16D 66/028 |
| | | | | | 188/1.11 W |
| 2018/0188013 | A1 | * | 7/2018 | Garcia | F16D 65/0043 |
| 2020/0191544 | A1 | * | 6/2020 | Xue | G01B 5/14 |

FOREIGN PATENT DOCUMENTS

| CN | 201731838 U | 2/2011 |
| CN | 201926390 U | 8/2011 |
| CN | 203310339 U | 11/2013 |
| CN | 203622082 U | 6/2014 |
| CN | 203869643 U | 10/2014 |
| CN | 205665017 U | 10/2016 |
| CN | 207066326 U | 3/2018 |

* cited by examiner

*Primary Examiner* — Yaritza Guadalupe-McCall
(74) *Attorney, Agent, or Firm* — Cooper Legal Group, LLC

(57) ABSTRACT

The present disclosure is to provide an adjustable vehicle wheel brake space inspection tool. The adjustable vehicle wheel brake space inspection tool is configured to detect the brake space of the vehicle wheel during usage and is configured to adapt to wheels of any size; and meanwhile, the adjustable vehicle wheel brake space inspection tool has the characteristics of high universality and detection accuracy, simple structure, low manufacturing cost, convenient operation, and the like.

1 Claim, 1 Drawing Sheet

ADJUSTABLE VEHICLE WHEEL BRAKE SPACE INSPECTION TOOL

CROSS REFERENCE TO RELATED APPLICATION

This application claims priority to Chinese Patent Application No. 201811546855.9, entitled ADJUSTABLE VEHICLE WHEEL BRAKE SPACE INSPECTION TOOL and filed on Dec. 18, 2018, which is incorporated herein by reference for all purposes.

FIELD OF THE INVENTION

The present disclosure relates to a vehicle wheel brake space inspection tool, in particular to an adjustable vehicle wheel brake space inspection tool.

BACKGROUND OF THE INVENTION

Parts, such as brake discs, brake calipers, and sensors, are often mounted in back cavities of vehicle wheels. In the actual application process, the vehicle wheels rotate while other mounted parts are fixed. In the processing process of the vehicle wheels, the brake space of the back cavities of vehicle wheels must be inspected completely to guarantee no interference with other parts in the application process. According to traditional inspection methods, a brake template is manufactured for each wheel type for inspection, and, if more wheel types need to be inspected, more brake templates will be needed. Therefore, an adjustable vehicle wheel brake space inspection tool is needed to improve the universality.

SUMMARY OF THE INVENTION

The object of the present disclosure is to provide an adjustable vehicle wheel brake space inspection tool which can detect the brake space of a vehicle wheel during usage and can adapt to wheels of any size.

In order to achieve the object, according to the technical schemes, an adjustable vehicle wheel brake space inspection tool comprises a positioning mandrel, a positioning sleeve, a jackscrew, a first set screw, a spring, a fixing rod, a second set screw, a sliding block, a rotating shaft, a rotating sleeve, a third set screw, a fixing block, and a dial indicator, wherein the lower end of the positioning mandrel is in a tapered shape; and an upper end of the positioning mandrel is cylindrical; an outer circumference of the positioning mandrel is slidably fitted with an inner hole of the positioning sleeve; the jackscrew is mounted on the positioning sleeve; a top end of the jackscrew is fitted with an open groove in the positioning mandrel; the spring is mounted within the positioning sleeve and arranged at a top end of the positioning mandrel; a left end of the fixing rod is in a circular-ring shape, and a right end of the fixing rod is in a rectangular shape; an inner circular-ring hole of the left end of the fixing rod is fitted with the outer circumference of the positioning sleeve; the first set screw is mounted on a circular ring of the left end of the fixing rod; the top end of the first set screw contacts with the outer circumference of the positioning sleeve; an inner hole of the sliding block is fitted with a rectangular portion of the right end of the fixing rod; the second set screw is mounted on a left side of the sliding block; the top end of the second set screw contacts with the rectangular portion of the right end of the fixing rod; the rotating shaft is fixed to a right side of the sliding block; the rotating sleeve is mounted on an outer side of the rotating shaft through a bearing; the third set screw is mounted on a flange of the rotating sleeve; a top end of the third set screw contacts with an end surface of the right side of the sliding block; the fixing block is fixed to a right side of the rotating sleeve; and the dial indicator is fixed on the fixing block.

In the working process, a tapered portion of the lower end of the positioning mandrel 1 is fitted with a central hole of a vehicle wheel, and thus the inspection tool is radially positioned; the positioning sleeve 2 is pressed downwards, so that a lower end surface of the positioning sleeve 2 is flush with a vehicle wheel flange plate, thereby an end surface of the inspection tool is positioned; the up-down position of the dial indicator 13 is adjusted by adjusting the relative height of a circular ring at the left end of the fixing rod 6 and the positioning sleeve 2; the left-right position of the dial indicator 13 is adjusted by adjusting the relative position of the sliding block 8 and the rectangular portion of the right end of the fixing rod 6; the angle of the dial indicator 13 in the vertical direction can be adjusted through the rotating sleeve 10 and the rotating shaft 9; the relative distance between a contact of the dial indicator 13 and the spoke fixing position of a back cavity of the vehicle wheel is adjusted; when the fixing rod 6 is rotated, the dial indicator 13 is rotated one round, and, if a point of the dial indicator 13 does not rotate, it is indicated that the contact does not interfere with the back cavity of the vehicle wheel, and then it is indicated that the vehicle wheel brake space meets the requirements.

The adjustable vehicle wheel brake space inspection tool can detect the brake space of the vehicle wheel during usage and can adapt to wheels of any size; and meanwhile, the adjustable vehicle wheel brake space inspection tool has the characteristics of high universality and detection accuracy, simple structure, low manufacturing cost, convenient operation, and the like.

Figure 1:
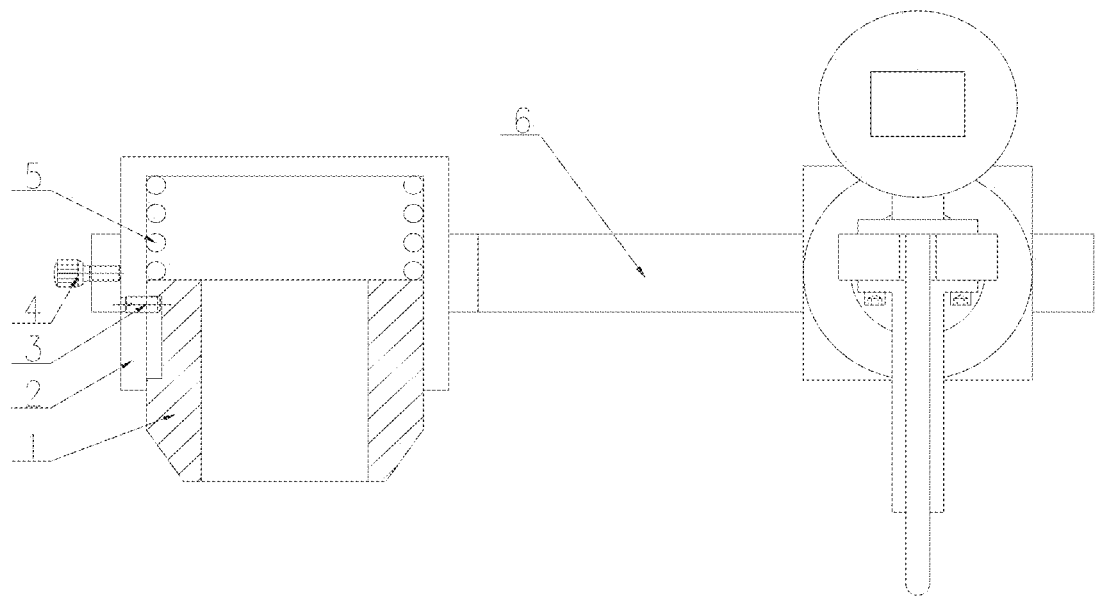
FIG. 1 is a front view of an adjustable vehicle wheel brake space inspection tool according to the present disclosure.
Figure 2:
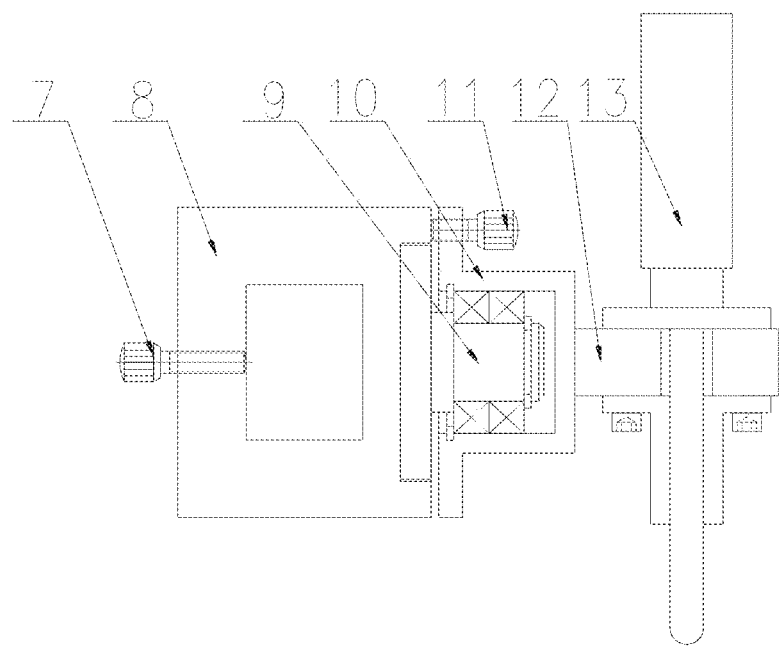
FIG. 2 is a partial left view of an adjustable vehicle wheel brake space inspection tool according to the present disclosure.

Where, 1—positioning mandrel, 2—positioning sleeve, 3—jackscrew, 4—first set screw, 5—spring, 6—fixing rod, 7—second set screw, 8—sliding block, 9—rotating shaft, 10—rotating sleeve, 11—third set screw, 12—fixing block and 13—dial indicator.

DETAILED DESCRIPTION OF EMBODIMENTS

The details and working conditions of a specific device according to the present disclosure are described below with reference to the drawings.

The inspection tool comprises a positioning mandrel 1, a positioning sleeve 2, a jackscrew 3, a first set screw 4, a spring 5, a fixing rod 6, a second set screw 7, a sliding block 8, a rotating shaft 9, a rotating sleeve 10, a third set screw 11, a fixing block 12 and a dial indicator 13, wherein a lower end of the positioning mandrel 1 is in a tapered shape and an upper end of the positioning mandrel 1 is cylindrical; an outer circumference of the positioning mandrel 1 is slidably fitted with an inner hole of the positioning sleeve 2; the jackscrew 3 is mounted on the positioning sleeve 2 and a top end of the jackscrew 3 is fitted with an open groove in the positioning mandrel 1; the spring 5 is mounted within the positioning sleeve 2 and arranged at a top end of the positioning mandrel 1; a left end of the fixing rod 6 is in a circular-ring shape, and a right end of the fixing rod 6 is in a rectangular shape; an inner circular-ring hole of the left end of the fixing rod 6 is fitted with the outer circumference of the positioning sleeve 2; the first set screw 4 is mounted on a circular ring of the left end of the fixing rod 6 and the top end of the first set screw 4 contacts with the outer circumference of the positioning sleeve 2; an inner hole of the sliding block 8 is fitted with a rectangular portion of the right end of the fixing rod 6; the second set screw 7 is mounted on a left side of the sliding block 8 and the top end of the second set screw 7 contacts with the rectangular portion of the right end of the fixing rod 6; the rotating shaft 9 is fixed to a right side of the sliding block 8; the rotating sleeve 10 is mounted on an outer side of the rotating shaft 9 through a bearing; the third set screw 11 is mounted on a flange of the rotating sleeve 10 and a top end of the third set screw 11 contacts with an end surface of the right side of the sliding block 8; the fixing block 12 is fixed to a right side of the rotating sleeve 10; and the dial indicator 13 is fixed on the fixing block 12.

In the working process, a tapered portion of the lower end of the positioning mandrel 1 is fitted with a central hole of a vehicle wheel, and thus the inspection tool is radially positioned; the positioning sleeve 2 is pressed downwards, so that a lower end surface of the positioning sleeve 2 is flush with a vehicle wheel flange plate, thereby an end surface of the inspection tool is positioned; the up-down position of the dial indicator 13 is adjusted by adjusting the relative height of a circular ring at the left end of the fixing rod 6 and the positioning sleeve 2; the left-right position of the dial indicator 13 is adjusted by adjusting the relative position of the sliding block 8 and the rectangular portion of the right end of the fixing rod 6; the angle of the dial indicator 13 in the vertical direction can be adjusted through the rotating sleeve 10 and the rotating shaft 9; the relative distance between a contact of the dial indicator 13 and the spoke fixing position of a back cavity of the vehicle wheel is adjusted; when the fixing rod 6 is rotated, the dial indicator 13 is rotated one round, and, if a point of the dial indicator 13 does not rotate, it is indicated that the contact does not interfere with the back cavity of the vehicle wheel, and then it is indicated that the vehicle wheel brake space meets the requirements.

The invention claimed is:

1. An adjustable vehicle wheel brake space inspection tool, comprising:
a positioning mandrel, a positioning sleeve, a jackscrew, a first set screw, a spring, a fixing rod, a second set screw, a sliding block, a rotating shaft, a rotating sleeve, a third set screw, a fixing block and a dial indicator;
wherein a lower end of the positioning mandrel is taper-shaped and an upper end of the positioning mandrel is cylindrically-shaped;
wherein an outer circumference of the positioning mandrel is slidably fitted with an inner hole of the positioning sleeve;
wherein the jackscrew is mounted on the positioning sleeve with a top end of the jackscrew fitted with an open groove in the positioning mandrel;
wherein the spring is mounted within the positioning sleeve and arranged at a top end of the positioning mandrel;
wherein a left end of the fixing rod is circular-ring-shaped, and a right end of the fixing rod is rectangularly-shaped;
wherein an inner circular-ring hole of the left end of the fixing rod is fitted with the outer circumference of the positioning sleeve;
wherein the first set screw is mounted on a circular ring of the left end of the fixing rod with a top end of the first set screw contacting with the outer circumference of the positioning sleeve;
wherein an inner hole of the sliding block is fitted with a rectangular portion of the right end of the fixing rod;
wherein the second set screw is mounted on a left side of the sliding block with a top end of the second set screw contacting with the rectangular portion of the right end of the fixing rod;
wherein the rotating shaft is fixed to a right side of the sliding block;
wherein the rotating sleeve is mounted on an outer side of the rotating shaft through a bearing;
wherein the third set screw is mounted on a flange of the rotating sleeve with a top end of the third set screw contacting with an end surface of the right side of the sliding block;
wherein the fixing block is fixed to a right side of the rotating sleeve; and
wherein the dial indicator is fixed on the fixing block.

* * * * *